US011304201B2

(12) United States Patent
Pezeshki et al.

(10) Patent No.: US 11,304,201 B2
(45) Date of Patent: Apr. 12, 2022

(54) BEAM INDICATION SET DETERMINATION

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/832,685

(22) Filed: Mar. 27, 2020

(65) Prior Publication Data

US 2020/0314857 A1 Oct. 1, 2020

Related U.S. Application Data

(60) Provisional application No. 62/826,735, filed on Mar. 29, 2019.

(51) Int. Cl.
*H04W 72/04* (2009.01)
*H04W 16/28* (2009.01)
(Continued)

(52) U.S. Cl.
CPC ....... *H04W 72/0493* (2013.01); *H04W 4/025* (2013.01); *H04W 16/28* (2013.01);
(Continued)

(58) Field of Classification Search
CPC .......... H04W 72/0493; H04W 72/046; H04W 16/28; H04W 4/025; H04W 76/27;
(Continued)

(56) References Cited

U.S. PATENT DOCUMENTS

2018/0343156 A1* 11/2018 Malik ................. H04J 11/0076
2018/0343653 A1   11/2018 Guo
(Continued)

FOREIGN PATENT DOCUMENTS

WO   WO-2017151876 A1 *  9/2017 ........... H04L 5/0055
WO   WO-2018232090 A1   12/2018

OTHER PUBLICATIONS

International Search Report and Written Opinion—PCT/US2020/025558—ISA/EPO—dated Jun. 12, 2020.
(Continued)

*Primary Examiner* — Afshawn M Towfighi

(57) ABSTRACT

Certain aspects of the present disclosure provide techniques for beam indication set determination. A method by a user equipment (UE) includes receiving a configuration of multiple beam indication sets. The method includes receiving an indication of parameters and, for each parameter, an associated subset of the multiple beam indication sets. The method includes determining a subset of the multiple configured beam indication sets based on the one or more parameters. The beam indications may be transmission configuration indicator (TCI) states for downlink transmissions and/or spatial relations for uplink transmissions. The base station (BS) can configure multiple beam indications and sets and signal to the UE which sets are configured or active during which intervals. The BS may signal the association based on a predetermined UE trace.

28 Claims, 14 Drawing Sheets

(51) Int. Cl.
*H04W 4/02* (2018.01)
*H04W 76/27* (2018.01)
*H04W 80/02* (2009.01)

(52) U.S. Cl.
CPC ....... *H04W 72/042* (2013.01); *H04W 72/046* (2013.01); *H04W 76/27* (2018.02); *H04W 80/02* (2013.01)

(58) Field of Classification Search
CPC ... H04W 80/02; H04W 72/042; H04W 72/04; H04W 72/048; H04B 7/088; H04B 7/0695
See application file for complete search history.

(56) References Cited

U.S. PATENT DOCUMENTS

| | | | |
|---|---|---|---|
| 2019/0037426 A1* | 1/2019 | Yu | H04W 72/046 |
| 2019/0319823 A1* | 10/2019 | Akkarakaran | H04B 7/0408 |
| 2020/0077428 A1* | 3/2020 | Zhou | H04W 72/1289 |
| 2020/0163074 A1* | 5/2020 | Tang | H04W 52/02 |
| 2020/0195334 A1* | 6/2020 | Zhou | H04L 5/005 |
| 2020/0213993 A1* | 7/2020 | Liu | H04W 8/24 |
| 2020/0221323 A1* | 7/2020 | Xu | H04L 5/0048 |
| 2021/0067234 A1* | 3/2021 | Guan | H04W 72/046 |

OTHER PUBLICATIONS

ZTE: "Enhancements on multi-beam operation", 3GPP Draft, 3GPP TSG RAN WG1 Meeting #96, R1-1901635, Enhancements on multi-beam operation, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599332, 18 pages, Retrieved from the Internet: URL: http://www.3gpp.org/ftp/tsg%5Fran/WG1%5FRL1/TSGR1%5F96/Docs/R1%2D1901635%2Ezip. [retrieved on Feb. 16, 2019] section 2.2.3; p. 9.

* cited by examiner

800a

| Time Interval | Beam indication set |
|---|---|
| 0 | 0 |
| 1 | 1 |
| 2 | 2 |
| 3 | 3 |
| 4 | 4 |

| Location/ Movement Parameter | Beam indication set |
|---|---|
| 0 | 0 |
| 1 | 1 |
| 2 | 2 |
| 3 | 3 |
| 4 | 4 |

FIG. 8B

BEAM INDICATION SET DETERMINATION

CROSS-REFERENCE TO RELATED APPLICATION(S)

This application claims benefit of and priority to U.S. Provisional Application No. 62/826,735, filed Mar. 29, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for a beam indication set determination.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes receiving a configuration of multiple beam indication sets. The method generally includes receiving an indication of one or more parameters and, for each parameter, an associated subset of the multiple beam indication sets. The method generally includes determining a subset of the multiple configured beam indication sets based on the one or more parameters.

In some examples, the beam indication sets comprises at least one of: transmission configuration indication (TCI) state sets or spatial relation sets.

In some examples, the UE determines a subset of configured beam indication sets based on the one or more parameters and: receives signaling indicating one or more active beam indication sets from the subset of configured beam indication sets; or determines the one or more active beam indication sets based on the one or more parameters.

In some examples, the UE determines one or more active beam indication sets of the multiple beam indication sets.

In some examples, the one or more parameters includes one or more time parameters, one or more UE location parameters, and/or one or more UE movement parameters.

In some examples, the configuration of the multiple beam indication sets and/or the indication of the one or more parameters is received via at least one of: radio resource control (RRC) signaling or a medium access control control element (MAC-CE).

In some examples, the UE receives a set of indices, each index associated with a subset of the multiple beam indication sets, and for each index an associated time interval or location interval in which the subset is configured or active. In some examples, the time intervals are indicated as absolute times indicating start times of the time intervals and the location intervals are indicated as starting locations of the location intervals. In some examples, the time intervals are indicated as an absolute time, indicating a start time of an initial time interval, and a set of durations of each of the time intervals and the location intervals are indicated as a starting location of an initial location interval and a set of distances of each location interval.

In some examples, the one or more parameters are associated with one or more UE traces, each time or location interval being associated with a UE trace segment. The one or more UE traces are one or more predetermined movements of the UE over a period of time corresponding to the one or more time intervals or over a distance corresponding to the one or more location intervals.

In some examples, the UE receives downlink control information (DCI) scheduling a transmission and indicating a beam indication, of the determined subset of beam indication sets, valid for the transmission.

In some examples, the beam indication sets comprise TCI state sets, the DCI schedules a physical downlink shared channel (PDSCH) transmission and indicates a TCI state, and the method further comprises determining one or more UE receive beams for receiving the PDSCH based on the indicated TCI state.

In some examples, the beam indication sets comprise spatial relation sets, the DCI schedules an uplink transmission and indicates a spatial relation, and the method further comprises determining one or more UE transmit beams for transmitting the uplink transmission based on the indicated spatial relation.

Certain aspects provide a method for wireless communications by a base station (BS). The method generally includes signaling a UE to configure the UE with multiple beam indication sets. The method generally includes sending the UE an indication of one or time parameters and, for each parameter, an associated subset of the multiple beam indication sets. The method generally includes determining a subset of the multiple configured beam indication sets based on the one or more time parameters.

In some examples, the beam indication sets comprises at least one of: TCI state sets or spatial relation sets.

In some examples, the BS determines a subset of configured beam indication sets based on the one or more parameters and: signals the UE indicating one or more active TCI state sets from the subset of configured beam indication sets; or determines the one or more active TCI state sets based on the one or more parameters.

In some examples, the BS determines one or more active beam indication sets of the multiple beam indication sets.

In some examples, the one or more parameters includes one or more time parameters, one or more UE location parameters, and/or one or more UE movement parameters.

In some examples, the configuration of the multiple beam indication sets and/or the indication of the one or more parameters is signaled via at least one of: RRC signaling or a MAC-CE.

In some examples, sending the indication of the one or more parameters and associated subsets of beam indication sets includes sending a set of indices, each index associated with a subset of the multiple beam indication sets, and for each index an associated time interval or location interval in which the subset is configured or active. In some examples, the time intervals are indicated as absolute times indicating start times of each of the time intervals and the location intervals are indicated as starting locations of the location intervals. In some examples, the associated time intervals are indicated as an absolute time indicating a start time of an initial time interval and a set of durations of each of the time intervals and the location intervals are indicated as a starting location of an initial location interval and a set of distances of each location interval.

In some examples, the one or more parameters are associated with one or more UE trace, each time or location interval being associated with a UE trace segment. The one or more UE traces are one or more predetermined movements of the UE over a period of time corresponding to the one or more time intervals or over a distance corresponding to the one or more location intervals.

In some examples, the method further includes transmitting DCI to the UE scheduling a transmission and indicating a beam, of the determined subset of the multiple beam indication sets, valid for the transmission. In some examples, the beam indication sets are TCI state sets, the DCI schedules a PDSCH transmission and indicates a TCI state, and the BS determines one or more transmit beams for transmitting the PDSCH based on the indicated TCI state. In some examples, the beam indication sets are spatial relation sets, the DCI schedules an uplink transmission and indicates a spatial relation, and the BS determines one or more receive beams for receiving the uplink transmission based on the indicated spatial relation.

Certain aspects provide an apparatus for wireless communications, such as a UE. The apparatus generally includes means for receiving a configuration of multiple beam indication sets. The apparatus generally includes means for receiving an indication of one or more parameters and, for each parameter, an associated subset of the multiple beam indication sets. The apparatus generally includes means for determining a subset of the multiple configured beam indication sets, based on the one or more parameters.

Certain aspects provide an apparatus for wireless communications, such as a BS. The apparatus generally includes means for signaling a UE to configure the UE with multiple beam indication sets. The apparatus generally includes means for sending the UE an indication of one or more parameters and, for each parameter, an associated subset of the multiple beam indication sets. The apparatus generally includes means for determining a subset of the multiple configured beam indication sets based on the one or more time parameters.

Certain aspects provide an apparatus for wireless communications, such as a UE. The apparatus generally includes at least one processor coupled with a memory. The at least one processor is configured to receive a configuration of multiple beam indication sets. The at least one processor is configured to receive an indication of one or more parameters and, for each parameter, an associated subset of the multiple beam indication sets. The at least one processor is configured to determine a subset of the multiple configured beam indication sets based on the one or more time parameters.

Certain aspects provide an apparatus for wireless communications, such as a BS. The apparatus generally includes at least one processor coupled with a memory. The at least one processor is configured to signal a UE to configure the UE with multiple beam indication sets. The at least one processor is configured to send the UE an indication of one or more parameters and, for each parameter, an associated subset of the multiple beam indication sets. The at least one processor is configured to determine a subset of the multiple configured beam indication sets based on the one or more parameters.

Certain aspects provide a computer readable medium having computer executable code stored thereon for wireless communications. The computer readable medium generally includes code for receiving a configuration of multiple beam indication sets. The computer readable medium generally includes code for receiving an indication of one or more parameters and, for each parameter, an associated subset of the multiple beam indication sets. The computer readable medium generally includes code for determining a subset of the multiple configured beam indication sets based on the one or more time parameters.

Certain aspects provide a computer readable medium having computer executable code stored thereon for wireless communications. The computer readable medium generally includes code for signaling a UE to configure the UE with multiple beam indication sets. The computer readable medium generally includes code for sending the UE an indication of one or more parameters and, for each parameter, an associated subset of the multiple beam indication sets. The computer readable medium generally includes code for determining a subset of the multiple configured beam indication sets, based on the one or more parameters.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8A is a table illustrating an example mapping of the beam configuration sets for time intervals of the duration, in accordance with certain aspects of the present disclosure.

FIG. 8B is a table illustrating an example mapping of the beam configuration sets for locations intervals of the UE trace, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
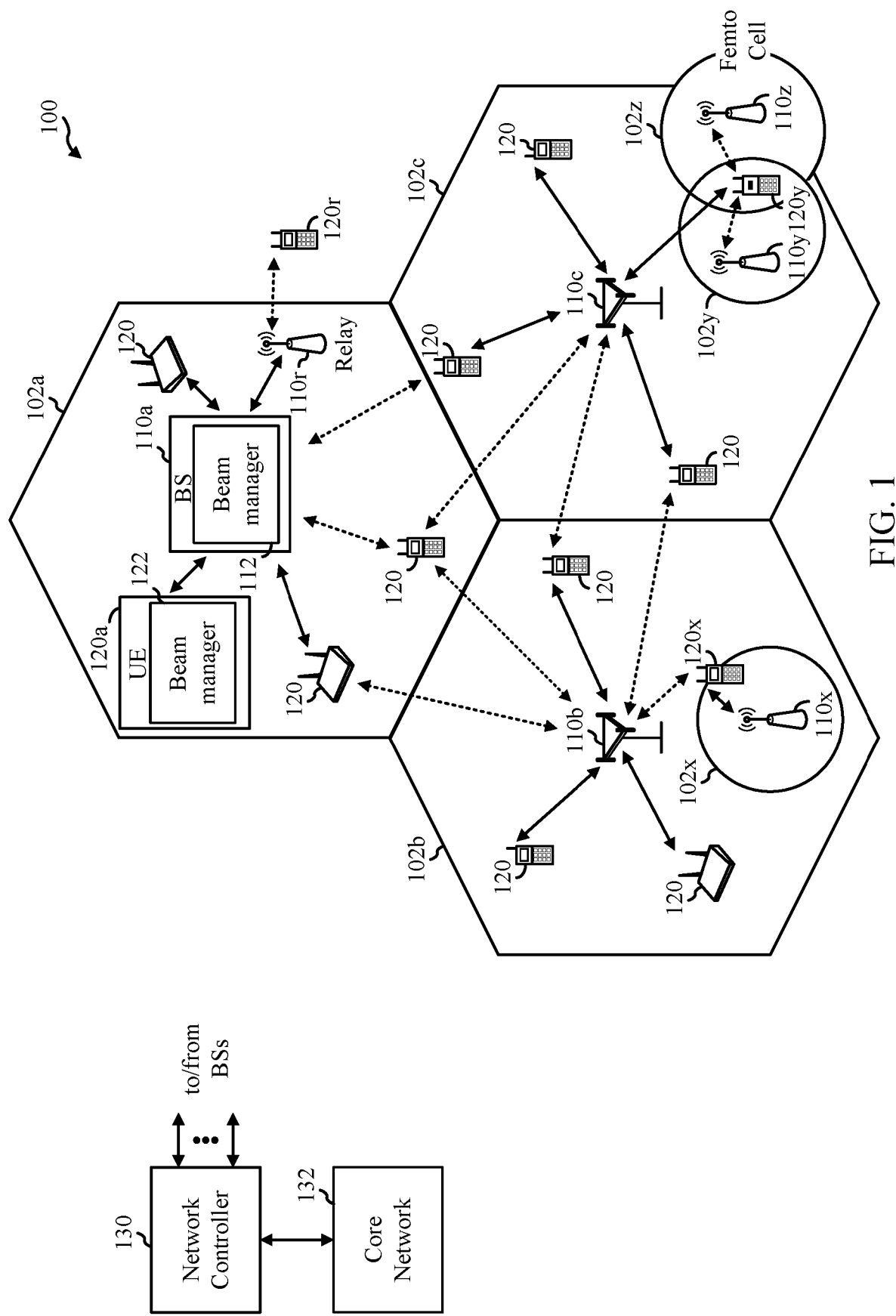
FIG. 1 is a block diagram conceptually illustrating an example telecommunications system, in accordance with certain aspects of the present disclosure.

Aspects of the present disclosure provide apparatus, methods, processing systems, and computer readable mediums for beam indication sets.

In certain systems, such as new radio (e.g., 5G NR) systems, the user equipment (UE) is configured with a set of active beam indication sets. For example, for uplink transmissions, the UE may be configured with a set of spatial relations. For downlink, the UE may be configured with a set of candidate transmission configuration indication (TCI) states. A TCI may point a downlink reference signal (e.g., such as the channel state information reference signal CSI-RS). The UE may select a beam for receiving another downlink transmission, such as a physical downlink shared (PDSCH), based on the beam for receiving the downlink reference signal associated with the TCI state indicated for the PDSCH. Similarly, a spatial relation may indicate a beam for the UE to use for sending an uplink transmission based on a beam associated with the spatial relation indicated for the uplink transmission.

For physical downlink shared channel (PDSCH), the UE may be configured with a set of up to eight TCI states, from the originally configured candidate TCI states. In some examples, the UE may be configured via higher layer signaling such as radio resource control (RRC) signaling with the set of candidate TCI states and a medium access control control element (MAC-CE) can activate a subset of up to 8 of the candidate TCI states. In some examples, a downlink control information (DCI) may configure/indicate one of the TCI states of the active TCI set of TCI states. For example, a 3-bit indicator in the DCI can indicate a TCI state that is valid for the scheduled PDSCH.

In some cases, the active beam indication set is frequently updated, such as when the UE is moving. This can lead to large overhead for signaling the active beams and, in turn, may lead to increased latency.

Aspects of the present disclosure provide techniques, apparatus, processing systems, and computer readable media, for beam indication set determination. For example, aspects of the present disclosure provide for a predetermined set of candidate (e.g., active and/or configured candidate set) TCI states and/or spatial relations as a function of time and/or UE movement states/location.

The following description provides examples of beam indication set determination, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR may and include support for half-duplex operation using time division duplexing (TDD). Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r) that receive a transmission of data and/or other information from an upstream station (e.g., a BS 110a or a UE 120r) and sends a transmission of the data and/or other information to a downstream station (e.g., a UE 120 or a BS 110) to facilitate communication between devices. A network controller 130 may couple to a set of BSs and provide coordination and control for these BSs. The network controller 130 may communicate with the BSs 110 via a backhaul.

The wireless communication network 100 may be an NR system (e.g., a 5G NR network). The devices may be configured for beam indication set determination. As shown in FIG. 1, the BS 110a has a beam manager 112a and the UE 120a has a beam manager 122a. The beam manager 112a may be configured to signal the UE 120a to configure the UE 120a with multiple beam indication sets. The beam manager 112a may be configured to send the UE 120a an indication of parameters and, for each time parameter, an associated subset of the multiple beam indication sets. The beam manager 112a may be configured to determine a subset of the multiple configured beam indication sets based on the one or more parameters.

Figure 2:
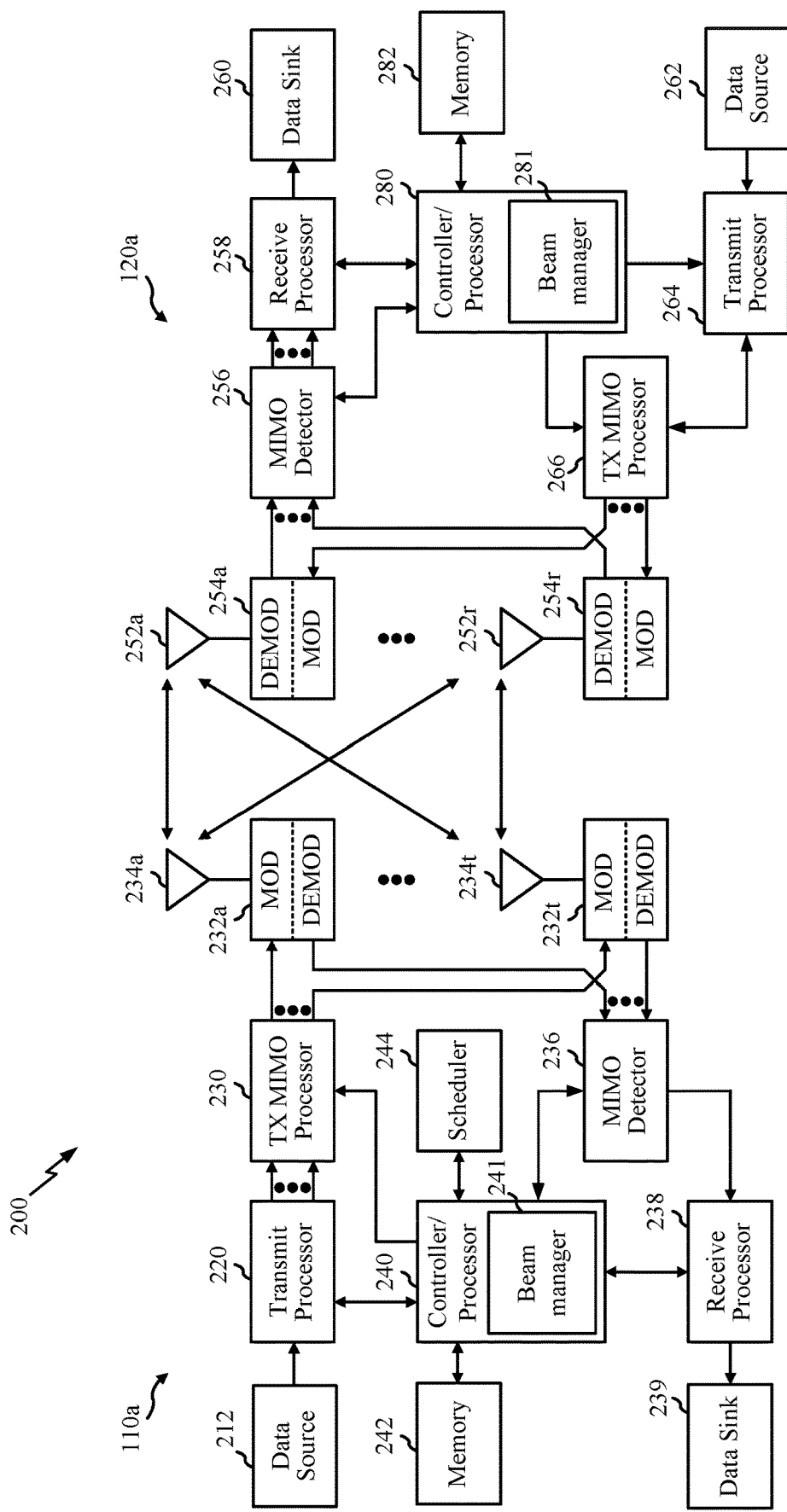
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120 may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120 and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam manager 241 and the controller/processor 280 UE 120 has a beam indication set determination module that may be configured for determining the active beam 281, according to aspects described herein. The memories 242 and 282 may store data and program codes for BS 110 and UE 120, respectively. A scheduler 244 may schedule UEs for data transmission on the downlink and/or uplink.

NR may utilize orthogonal frequency division multiplexing (OFDM) on the downlink and single-carrier frequency division multiplexing (SC-FDM) on the uplink. OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a "resource block" (RB), may be 12 consecutive frequency subcarriers (or 180 kHz). The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.). The symbol and slot lengths scale with the subcarrier spacing.

Figure 3:
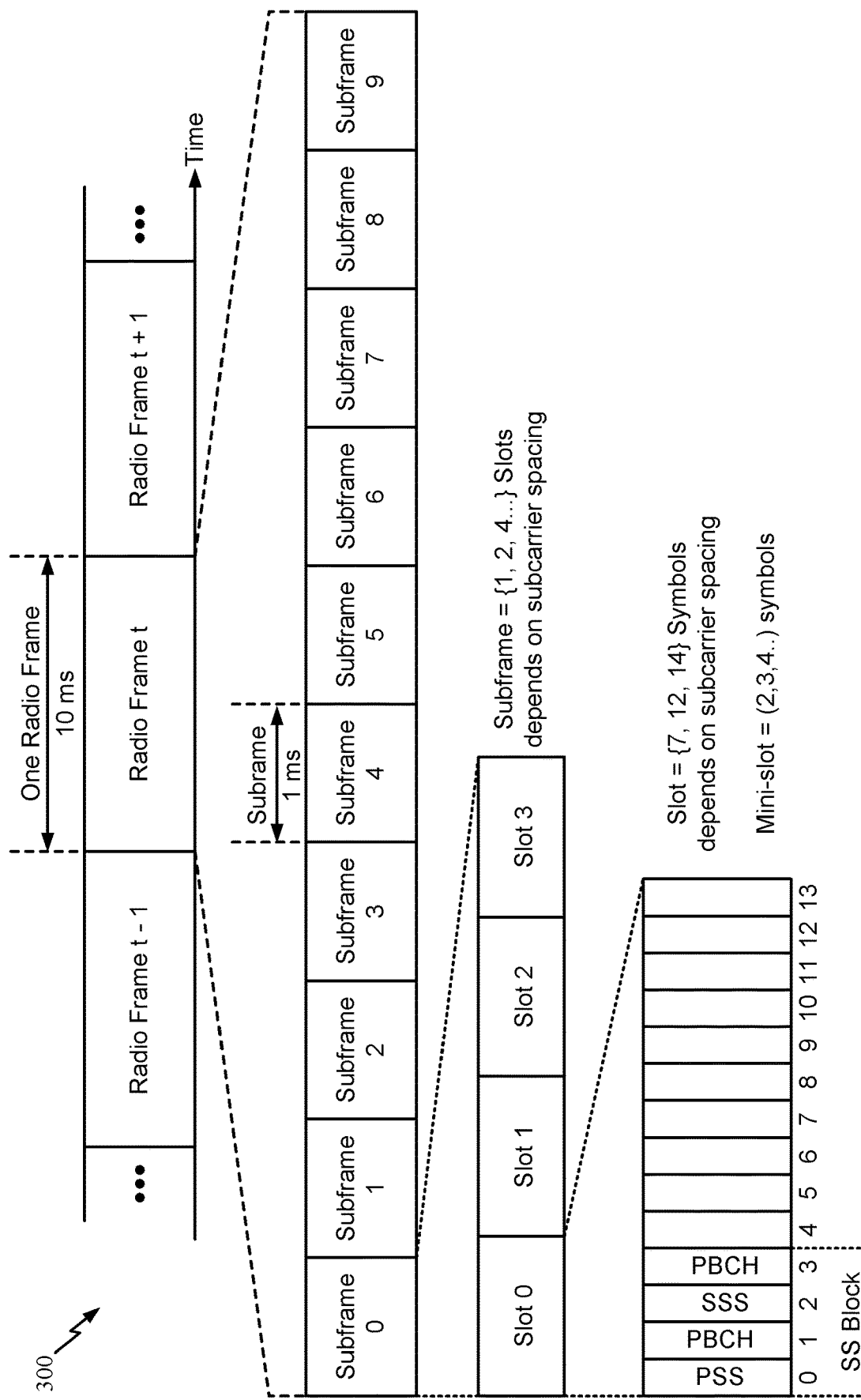
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4B:
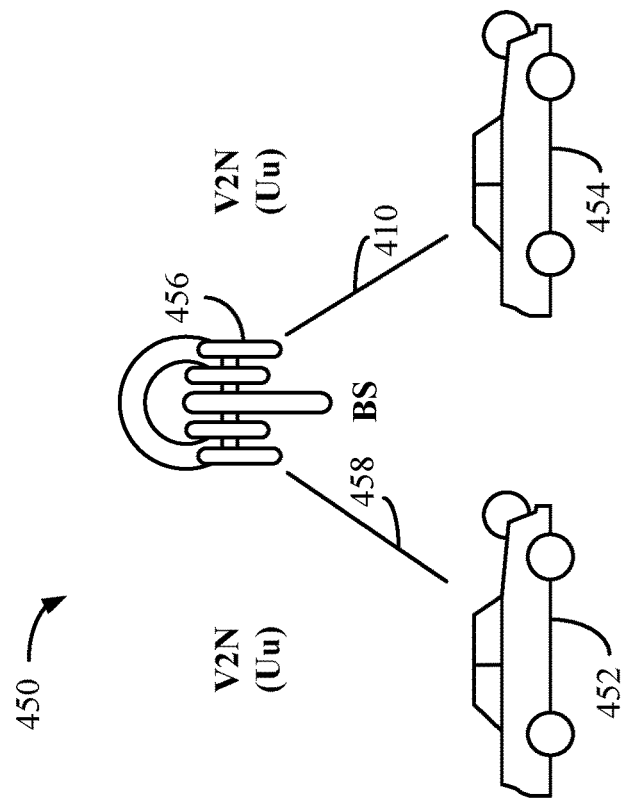
FIG. 4A and FIG. 4B show diagrammatic representations of example vehicle to everything (V2X) systems, in accordance with certain aspects of the present disclosure.
Figure 4A:
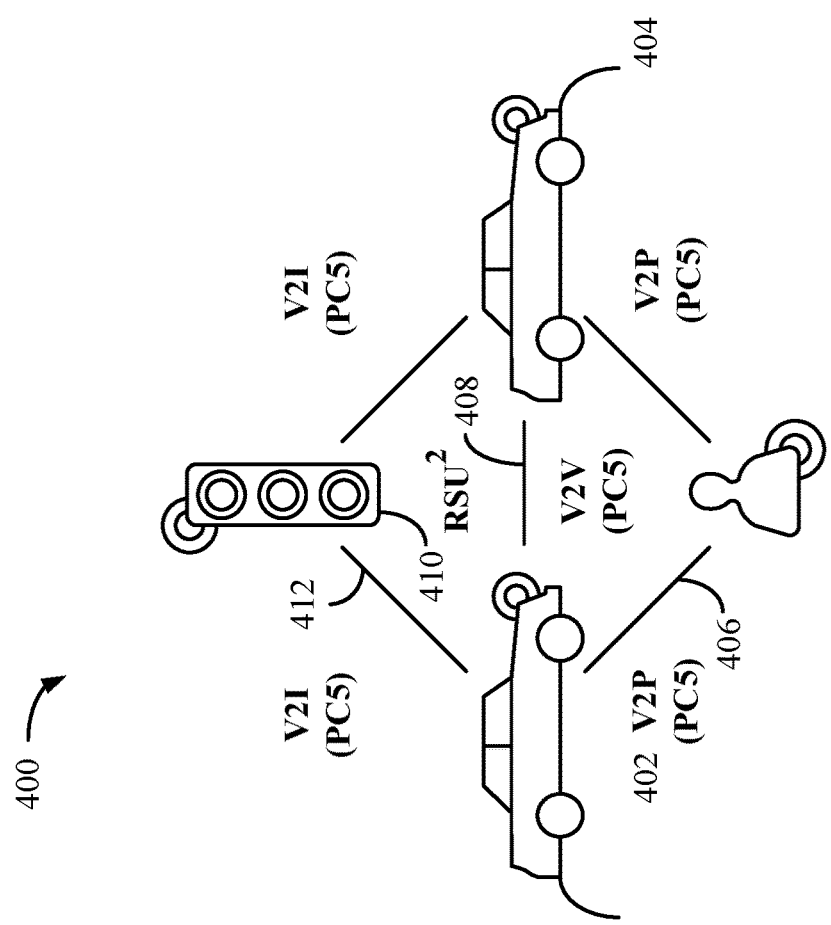

FIG. 4A and FIG. 4B show diagrammatic representations of example V2X systems, in accordance with some aspects of the present disclosure. For example, the vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as side link communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

In some examples, sidelink is used in Industrial Internet-of-Things (IIOT) systems. IIOT may be performed in connection with factory automation. An IIOT system may include a sensor, an actuator, a piece of industrial equipment, etc. A Programmable Logic Controller (PLC) may receive information from such sensor(s)/actuator(s) and may provide commands to the sensor(s)/actuator(s) or to factory equipment associated with the sensor(s)/actuator(s). For example, a PLC may automate control of machines and control systems of industrial electromechanical processes, such as controlling machinery on factory assembly lines, amusement rides, light fixtures, etc. Additionally, latency and reliability targets in IIOT systems may be stringent. For example, IIOT may target a latency of around 1-2 ms or less and a reliability of around $10^{-5}$ to $10^{-6}$, such as 99.9999% reliability, or better for both data and control channels.

Figure 5:
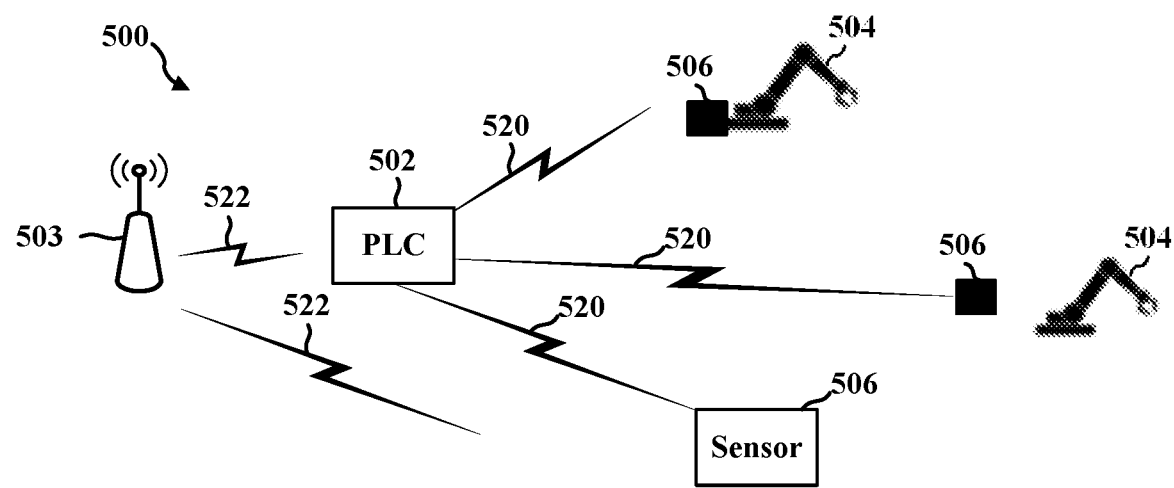
FIG. 5 illustrates an example wireless communication system including a base station, a PLC, and sensor(s)/actuator(s), in accordance with certain aspects of the present disclosure.

FIG. 5 illustrates an example communication system 500 including a PLC 502 that exchanges wireless communication 520 with sensors/actuators 506 that may be associated with equipment 504. The communication may also include a BS 503 that exchanges communication 522 with the PLC 502 and/or communication 522 with the sensors/actuators 506. The communication between the PLC 502 and sensor(s)/actuator(s) 506 may include cyclic exchanges of information. The PLC 502 may potentially exchange cyclic information with a large number of sensors/actuators 506. In some aspects, a PLC 502 may transmit data, either uplink data or sidelink data, to sensor(s)/actuator(s) 506. In some examples, the BS 503 may include a 5G NR base station, such as a gNB. The communication between the PLC 502 and sensor(s)/actuator(s) 506 may include cyclic exchanges of information. The PLC 502 may potentially exchange cyclic information with a large number of sensors/actuators 506. In some examples, semi-persistent scheduling (SPS) may be used.

As discussed above, aspects of the disclosure relate to beam indication set determination.

Quasi-colocation (QCL) signaling can be used for reference signals (RS) and channels across scenarios involving multiple cells, such as coordinated multipoint (CoMP) scenarios in which multiple transmit receive points (TRPs) integrated access and backhaul (IAB) nodes each have their own cell identification (ID). QCL assumptions generally refer to assumptions that, for a set of signals or channels considered to be QCL related (or simply "QCL'd" for short), certain characteristics derived for (measured from) one of the signals or channels may be applied to the other. As an example, if PDSCH DMRS is QCL'd with other DL RS, a UE may process PDSCH based on measurements of the other DL RS. In some cases, this may lead to more efficient processing, allowing a UE to use (re-use) previous measurements of the QCL'd RS, which may speed processing of a current channel.

In some cases, QCL assumptions for receptions/transmissions of signals and channels may be signaled via a mechanism referred to as Transmission Configuration Indication (TCI) states, sometimes also referred to as Transmission Configuration Indicator states. A TCI state associates DL RSs (e.g., one or two) with a corresponding QCL type. An RRC message (e.g., PDSCH-Config field) can contain a field (e.g., a qcl-info) with a list of TCI states indicating a transmission configuration which includes QCL-relationships between the DL RSs in one RS set and the PDSCH DMRS ports. The TCI states may be indicated by an ID (e.g., a TCI-StateId). A DL BWP and cell, in which the RS is located, may also be indicated.

The QCL assumptions may be grouped into different types that correspond to the parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, Type C may indicate a still different set of parameters. In some cases, spatial QCL assumptions may be indicated, for example, by Type D. Spatial QCL may mean a (Tx or Rx) beam selected based on a certain signal measurement may be applied to the QCL related signal. If at least spatial QCL is configured/indicated, an RRC field (e.g., a tci-PresentInDCI field) can indicate if TCI field is present or not present in DL-related DCI and when the field is absent the UE considers the TCI to be absent/disabled.

In some examples, the UE can be configured with a list of up to M candidate TCI states by a higher layer parameter to decode PDSCH. The UE may receive an activation command (e.g., in a MAC-CE) to map one or more of the higher layer configured TCI states (e.g., up to 8 TCI states) to the codepoints of a TCI field in DCI. The DCI can then indicate on the active TCI states valid for the PDSCH.

For the uplink, a spatial relation parameter may be used. The spatial relation parameter may configure the spatial relation between a reference RS (e.g., SSB, CSI-RS, and/or SRS) and an uplink transmission (e.g., PUCCH, PUSCH, SRS). The UE can be configured with a set of spatial relations via higher layer signaling (e.g., RRC). A MAC-CE can be used to select a subset (e.g., a single) spatial relation. From the spatial relation, the UE may decide a UE transmit beam to use for uplink transmission.

If the active beam indication set (e.g., TCI states and/or spatial relations) is signaled frequently, then the overhead can become large. For example, when the UE performs dynamic beam training, the active beam indication set may be signaled. The dynamic beam training may include a beam pair link (BPL) discovery procedure (e.g., the P1 procedure) and/or a beam refinement procedure (e.g., the P2 procedure). When the UE is moving, the active transmission configuration set may be updated frequently. The increased overhead may lead to increased latency due to signaling the active beam indication set each time.

Therefore, approaches for reducing overhead for the active beam indication configuration set are desirable.

Example Beam Indication Set Determination

Aspects of the present disclosure provide techniques, apparatus, processing systems, and computer readable media, for beam indication set determination. For example, aspects of the present disclosure provide for a predetermined set of beam indication sets (e.g., the configured candidate sets and/or the active sets) as a function of time and/or movement/location states.

Figure 6:
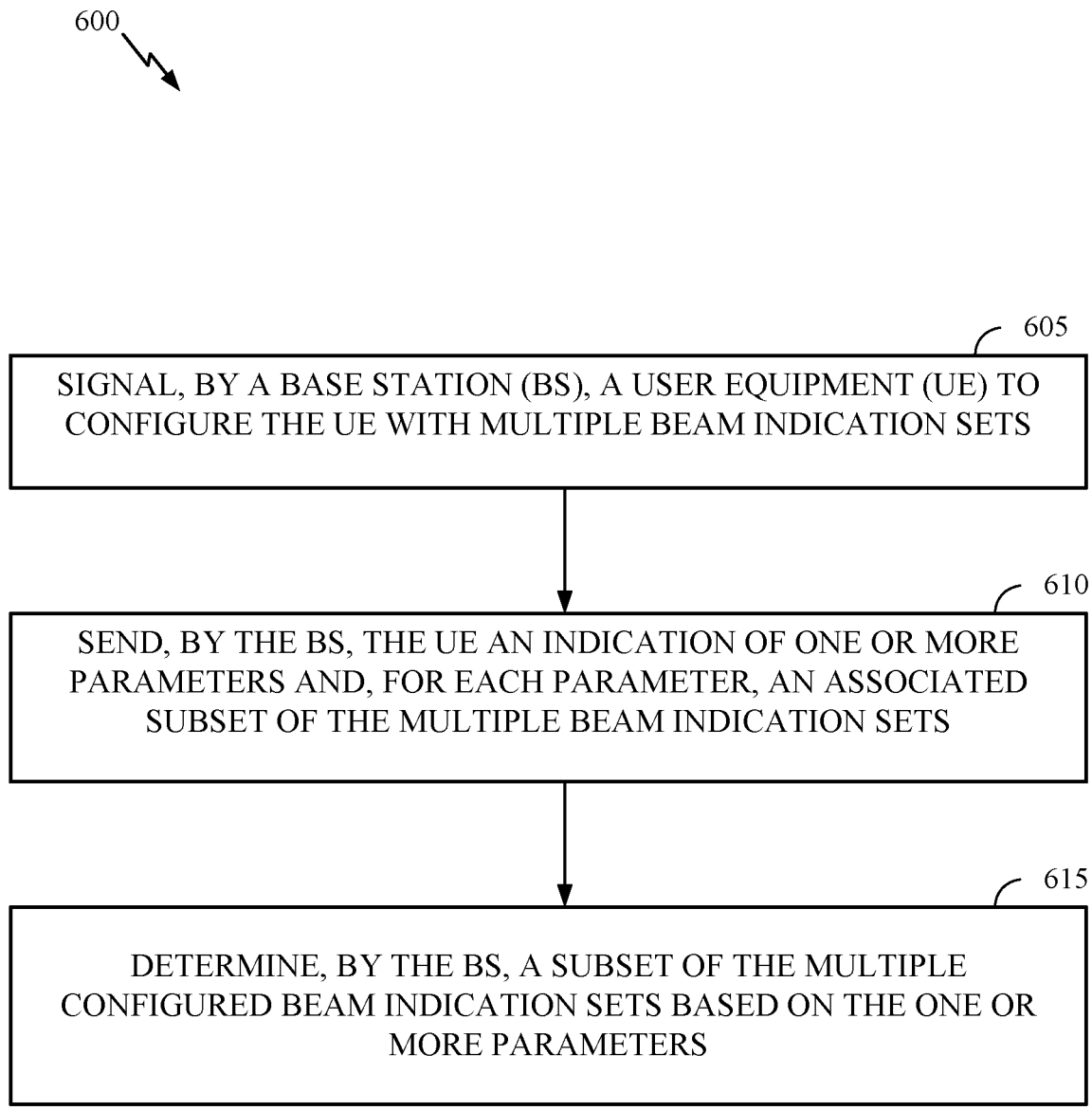
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. The operations 600 may be performed, for example, by a base station (e.g., such as a BS 110a in the wireless communication network 100). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 605, by signaling a user equipment (UE) to configure the UE with multiple beam indication sets. The multiple beam indications may be TCI states and/or spatial relations. For example, the multiple beam indications may be TCI state sets (e.g., for a downlink transmission) and/or spatial relation parameter sets (e.g., for uplink transmission). The BS may signal the beam indications set via radio resource control (RRC) signaling and/or a medium access control element (MAC-CE).

At 610, the BS sends the UE an indication of one or more parameters and, for each parameter, an associated subset of the multiple beam indication sets. In some examples, the one or more parameters are time and/or movement/location parameters. The time parameters may be absolute times or relative times. The parameters may indicate time or location intervals, the time or location intervals associated with different subsets of the multiple beam indication sets. In some examples, the BS sends a set of indices associated with subsets of the multiple beam indication sets and a set of associated time or location intervals in which the beam indications subsets are active. In some examples, the set of associated time intervals is a set of absolute times indicating a start time of each time interval. In some examples, the set of associated time intervals includes an absolute time indicating a start time of an initial time interval and a set of durations of each time interval. In some examples, the set of associated movement/location intervals is a set of absolute locations or a set of distances moved. In some examples, the set of associated time or location intervals are associated with UE trace, each time or location interval being associated with a UE trace segment. The UE trace may be a predetermined movement of the UE over a period of time corresponding to the set of time intervals.

At 615, the BS determines a subset from the multiple configured beam indication sets based on the one or more time parameters. In some examples, the subset of beam indication sets corresponds to a subset of configured beam indication sets or a subset of active beam indication sets. The BS may transmit to the UE using the subset of beam indications. For example, the BS may determine a beam to use for transmitting or receiving from the subset of beam indications. The BS may transmit downlink control information (DCI) to the UE scheduling a transmission and indicating a beam, of the determined active set of beam indication sets, valid for the transmission. In some examples, the beam indication sets are TCI state sets, the DCI schedules a physical downlink shared channel (PDSCH) transmission and indicates a TCI state, and the BS determines one or more transmit beams for transmitting the PDSCH based on the indicated TCI state. In some examples, the beam indication sets are spatial relation sets, the DCI schedules an uplink transmission and indicates a spatial relation, and the BS determines one or more receive beams for receiving the uplink transmission based on the indicated spatial relation.

In some examples, the UE may have predefined (e.g., predetermined) movements. In some examples, the UE's predefined movements may occur at predefined times. For examples, in industrial Internet-of-Things (IIoT) applications, the UE may perform predefined movements at predefined times. The UE movements may be referred to as a UE trace. The UE trace may occur over a duration. The UE trace may have multiple trace segments that occur in time intervals of the duration of the trace.

Figure 7:
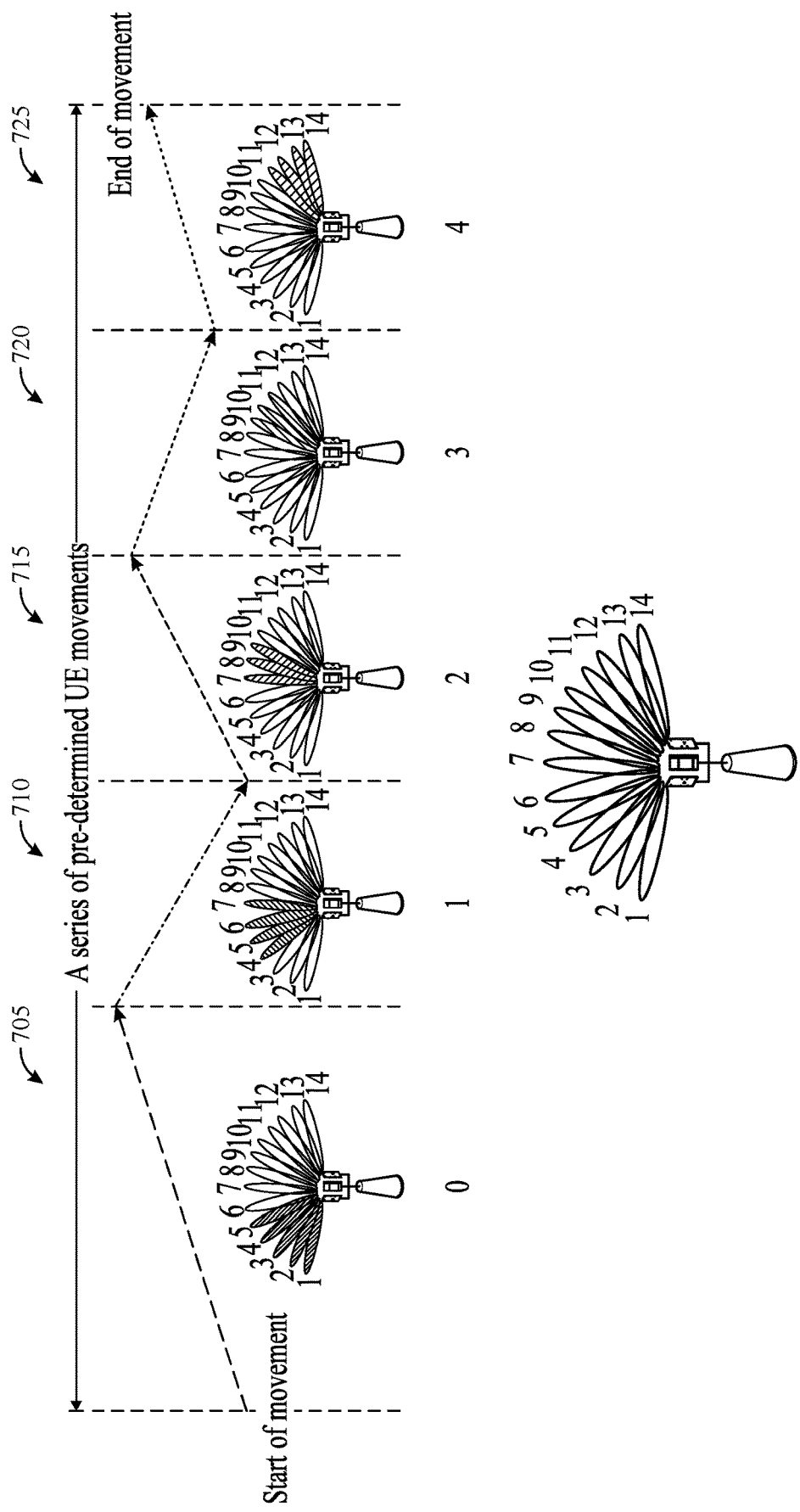
FIG. 7 illustrates example beam configuration sets for an example predetermined UE trace over a duration, in accordance with certain aspects of the present disclosure.

As the UE moves, its position with respect to the BS (e.g., a gNB) changes. Thus, the beams used for communication between the UE and BS may also change and, accordingly, the beam indication sets at the UE may be determined (e.g., updated). FIG. 7 illustrates example beam configuration sets for an example predetermined UE trace over a duration, in accordance with certain aspects of the present disclosure. As shown in the FIG. 7, a UE (not shown) performs a series of movements 705, 710, 715, 720, 725 over the time intervals 0, 1, 2, 3, 4, respectively. In FIG. 7, the BS is in an example location with respect to the UE movement path. The configured/active beam sets shown in the example in FIG. 7 may assuming the location of the BS shown in FIG. 7. In other examples, the BS may be in other locations with respect to the UE movement path and the configured/active beams used may be different than those shown in FIG. 7.

According to certain aspects, the UE may be configured with beam indication sets associated with the predefined UE movements and/or the time, as shown in FIG. 7. The UE may be configured with an indication (e.g., a table, mapping, function, association, etc.) of which beam indication set is configured and/or active for each of the time and/or movement/location intervals in the UE trace. For example, because the UE movements are predefined, the BS may know the UE movements beforehand, and may know the time for UE movements as well, and can configure the UE with the beam indication set to be configured/active at those times. In addition, the BS knows to use the indicated beam indication sets at the associated times. In some cases, however, the times may be uncertain. For example, the UE speed may change. Thus, in some examples, the BS can configure the UE with the beam indication sets to be configured/active at predefined locations, distances, and/or movement states.

Thus, in some examples, instead of signaling the UE the configured/active beam indication set at each time or movement/locations interval, the BS can preconfigure the UE with the association of the subsets of the multiple beam indication sets and which beam indication subset is configured/active during each time and/or location/movement interval. This may reduce the overhead associated with dynamic beam training (e.g., such as the beam management procedures) and active set signaling. According to certain aspects, the indication of the beam indication subsets may be signaled to the UE before the start of a UE trace.

FIG. 8A is a table 800a illustrating an example mapping of the example beam configuration sets for time intervals of the duration, in accordance with certain aspects of the present disclosure. As shown in FIG. 8A, in some examples the BS can signal the UE the active beam indication set index (e.g., the configured/active TCI or spatial relation set index 0, 1, 2, 3, 4 as shown in the table 800a) and the associated time interval (e.g., the time interval 0, 1, 2, 3, 4 as shown in the table 800a). FIG. 8B is a table 800b illustrating an example mapping of the example beam configuration sets for time intervals of the duration, in accordance with certain aspects of the present disclosure. As shown in FIG. 8B, in some examples the BS can signal the UE the active beam indication set index (e.g., the configured/active TCI or spatial relation set index 0, 1, 2, 3, 4 as shown in the table 800b) and the associated movement/ location interval (e.g., the movement/location interval 0, 1, 2, 3, 4 as shown in the table 800a).

Figure 9:
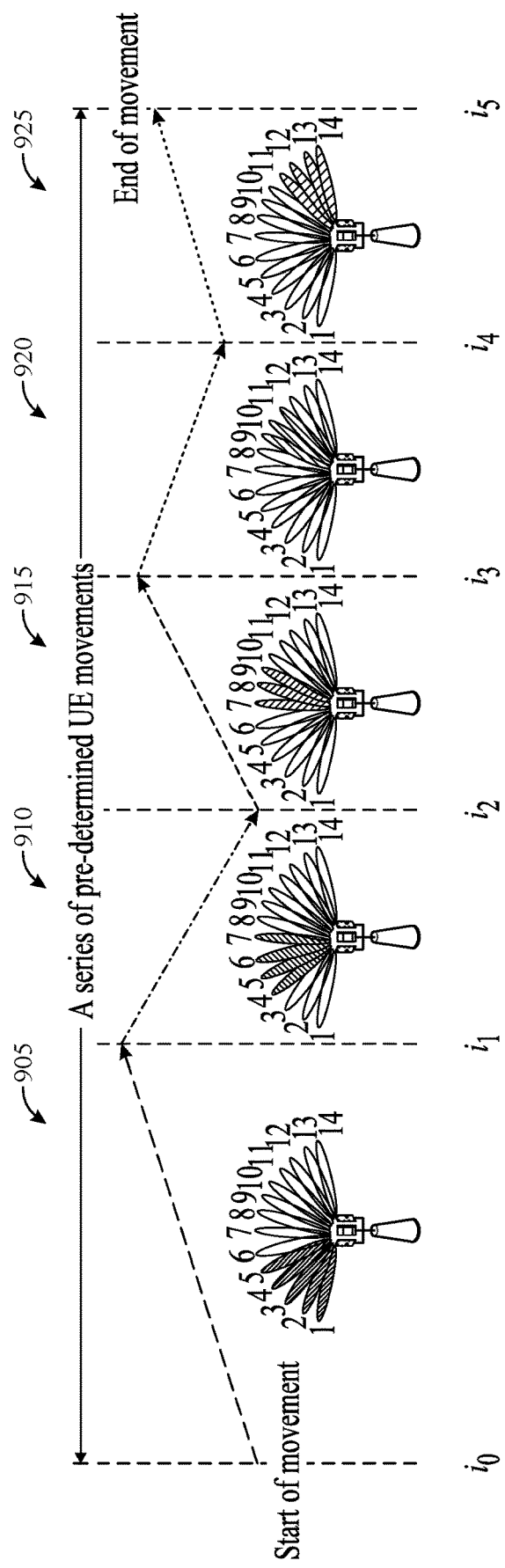
FIG. 9 illustrates starting times for the example time intervals of the duration of the example predetermined UE trace, in accordance with certain aspects of the present disclosure.

According to certain aspects, the parameters (e.g., the time and/or movement/location intervals) may be signaled as starting points of each interval. For example, the BS may signal the start time and/or location of each of the intervals (e.g., a start time and/or location at which the associated beam indication subset is configured/active). As shown in FIG. 9, the BS can signal the start points $i_0, i_1, i_2, i_3$, and $i_4$ for the example time intervals 0, 1, 2, 3, and 4, respectively. In some examples, the BS signals the start points to the UE via RRC signaling or a MAC-CE. The start points may be signaled as absolute times, location, or movement states.

According to certain aspects, the parameter may be signaled as relative information. For example, the BS may signal an indication of the initial start time, such as an initial start time or start location at which the UE trace begins, and signal an indication of a duration, length, distance, speed, or other relative information indicating the time or location intervals. For the example UE trace shown in FIG. 9, the BS may signal the start point $i_0$, and the BS signals the relative durations, lengths, distances, speeds, or the like, of the intervals 0, 1, 2, 3, and 4 as $i_1$-$i_0$, $i_2$-$i_1$, $i_3$-$i_2$, $i_4$-$i_3$, and $i_5$-$i_4$, respectively. In some examples, the BS signals the initial start time and relative times (i.e., durations of the time intervals or trace segments 905, 910, 915, 920, 925) to the UE via RRC signaling or a MAC-CE.

According to certain aspects, the BS signals the exact beam indication to the UE in DCI. For example, the BS signals the TCI state or spatial relation parameter for the uplink or downlink transmission being scheduled by the DCI.

Figure 10:
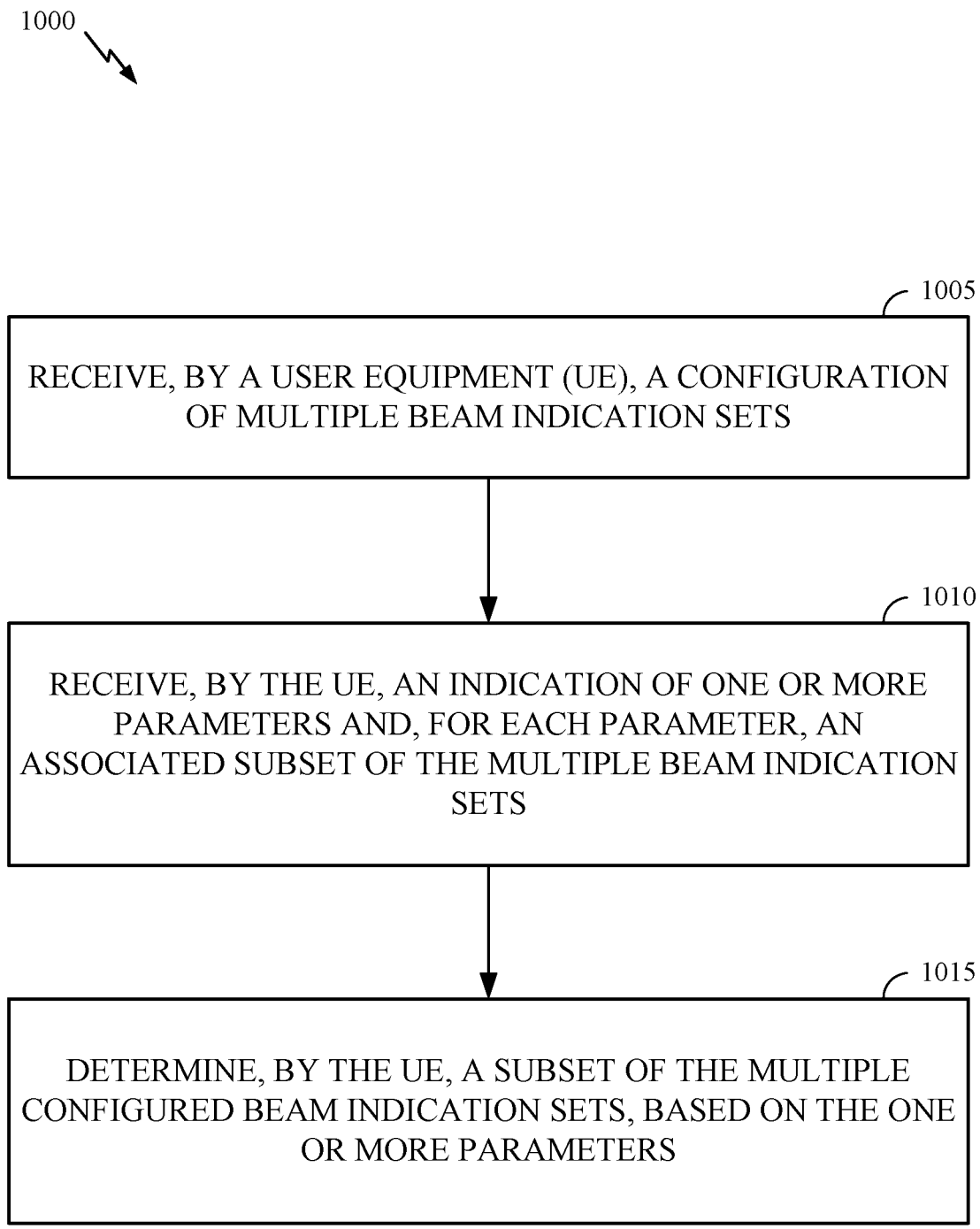
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by UE (e.g., such as a UE 120a in the wireless communication network 100). The operations 1000 may be complimentary operations by the UE to the operations 600 performed by the BS. Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at 1005, by receiving (e.g., via RCC and/or MAC-CE) a configuration of multiple beam indication sets (e.g., TCI state sets and/or spatial relation sets).

At 1010, the UE receives an indication of one or more parameters and, for each parameter, an associated subset of the multiple beam indication sets. In some examples, the UE receives a set of indices associated with the multiple beam indication sets and a set of associated time or movement/location intervals in which the beam indications sets are configured/active. In some examples, the set of associated intervals includes a set of absolute times or locations indicating a start of each interval. In some examples, the set of associated intervals includes an absolute time or location indicating a start of an initial interval and a set of durations or lengths of each interval. In some examples, the set of associated intervals are associated with a UE trace. For example, each interval may be associated with a UE trace segment. The UE trace may be a predetermined movement of the UE over a period of time corresponding to the set of intervals.

At 1015, the UE determines a subset of the multiple configured beam indication sets based on the one or more parameters.

In some examples, the UE receives DCI scheduling a transmission and indicating a beam, of the determined subset of beam indication sets, valid for the transmission. In some examples, the DCI schedules a PDSCH and indicates a TCI state. In this case, the UE may determine one or more UE receive beams for receiving the PDSCH based on the indicated TCI state. In some examples, the DCI schedules an uplink transmission and indicates a spatial relation. In this case, the UE may determine one or more UE transmit beams for transmitting the uplink transmission based on the indicated spatial relation.

Figure 11:
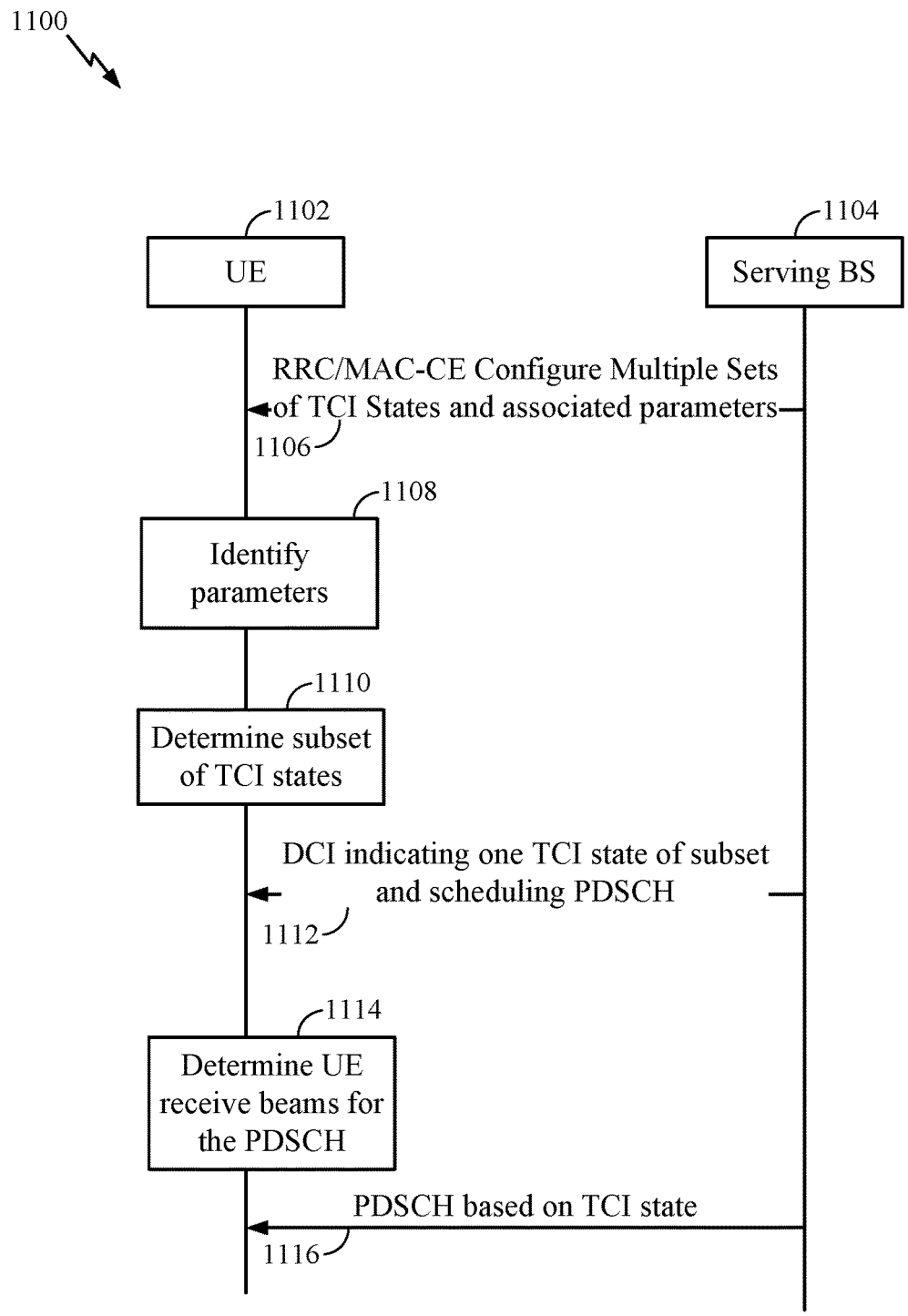
FIG. 11 is a call flow diagram illustrating example signaling for downlink beam indication set determination, in accordance with certain aspects of the present disclosure.

FIG. 11 is a call flow diagram illustrating example signaling 1100 for downlink beam indication set determination, in accordance with certain aspects of the present disclosure. As shown in FIG. 11, at 1106, a UE 1102 may receive RRC and/or MAC-CE signaling configuring multiple sets of TCI states and associated parameters from the serving BS 1104. For example, the UE 1102 receives the absolute or relative points indicating the time or location intervals and the indication of which TCI state set is active in that interval. At 1108, the UE 1102 identifies the associated parameters. For example, the UE determines the current time or location interval. And at 1110, the UE 1102 determines the subset of configured/active set of TCI states. For example, based on the parameters and associated TCI state sets received from the serving BS 1104, the UE 1102 can determine the associated TCI state subset for the identified current interval. At 1112, the UE 1102 may receive DCI from the serving BS 1104 indicating one TCI state of the subset of TCI states and scheduling a PDSCH. At 1114, the UE 1102 may determine one or more UE receive beams for receiving the PDSCH. And at 1116, the UE 1102 receives the PDSCH transmitted based on the indicated TCI state and determined beams.

Figure 12:
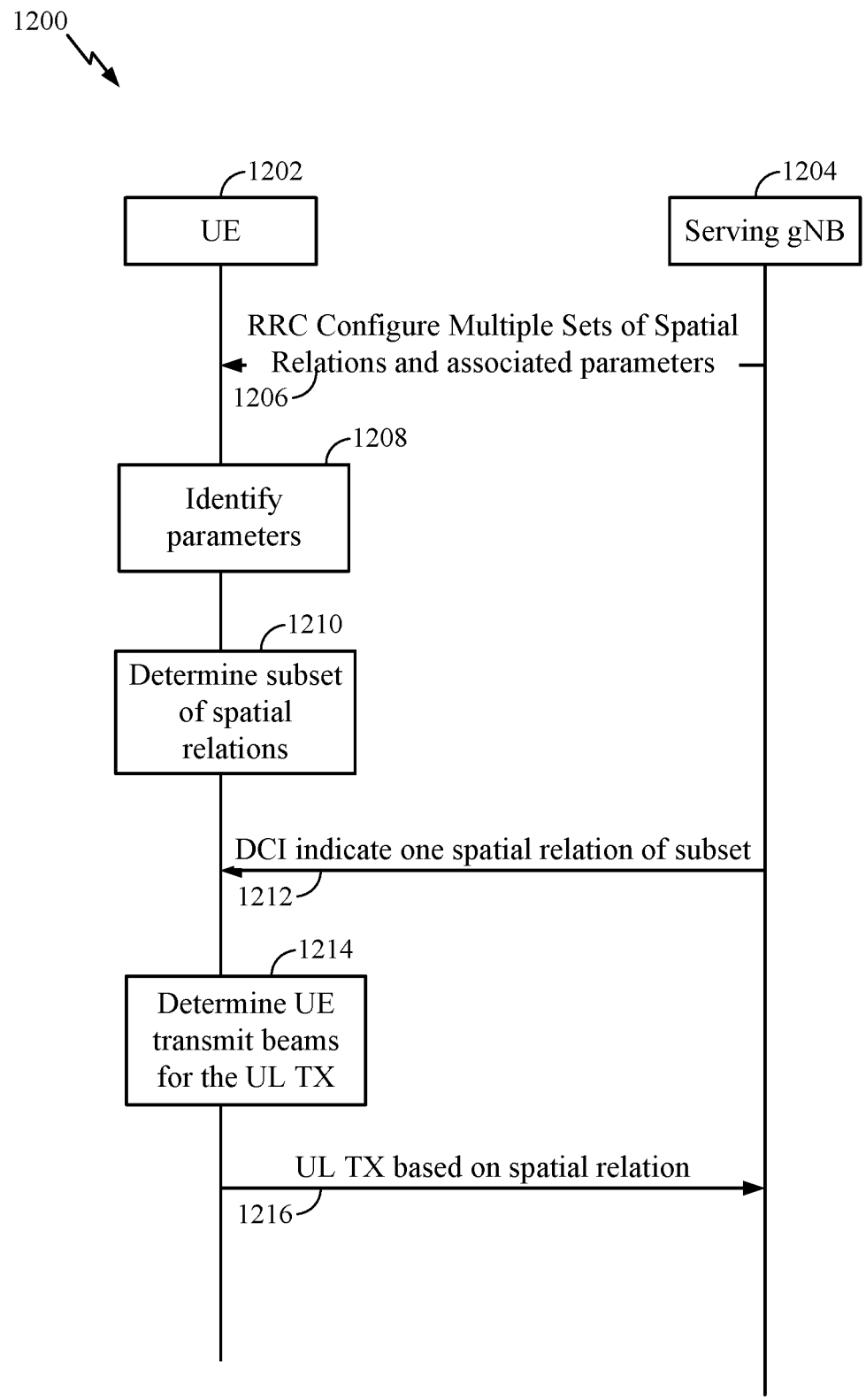
FIG. 12 is a call flow diagram illustrating example signaling for uplink beam indication set determination, in accordance with certain aspects of the present disclosure.

FIG. 12 is a call flow diagram illustrating example signaling 1200 for uplink beam indication set determination, in accordance with certain aspects of the present disclosure. As shown in FIG. 12, at 1206, a UE 1202 may receive RRC and/or MAC-CE signaling configuring multiple sets of spatial relations and associated parameters from the serving BS 1204. For example, the UE 1202 receives the absolute or relative times or locations indicating the intervals and the indication of which spatial relation set is configured/active in that interval. At 1208, the UE 1202 identifies the associated parameters. For example, the UE 1202 determines the current time interval. And at 1210, the UE 1202 determines the active set of spatial relations. For example, based on the parameters and associated spatial relations received from the serving BS 1204, the UE 1202 can determine the active spatial relation set for the identified current time interval. At 1212, the UE 1202 may receive DCI from the serving BS 1204 indicating one spatial relation of the active set of spatial relations and scheduling an uplink transmission (UL TX). At 1214, the UE 1202 may determine one or more UE transmit beams for transmitting the uplink transmission. And at 1216, the UE 1202 transmits the uplink transmission based on the indicated spatial relation and determined beams.

Figure 13:
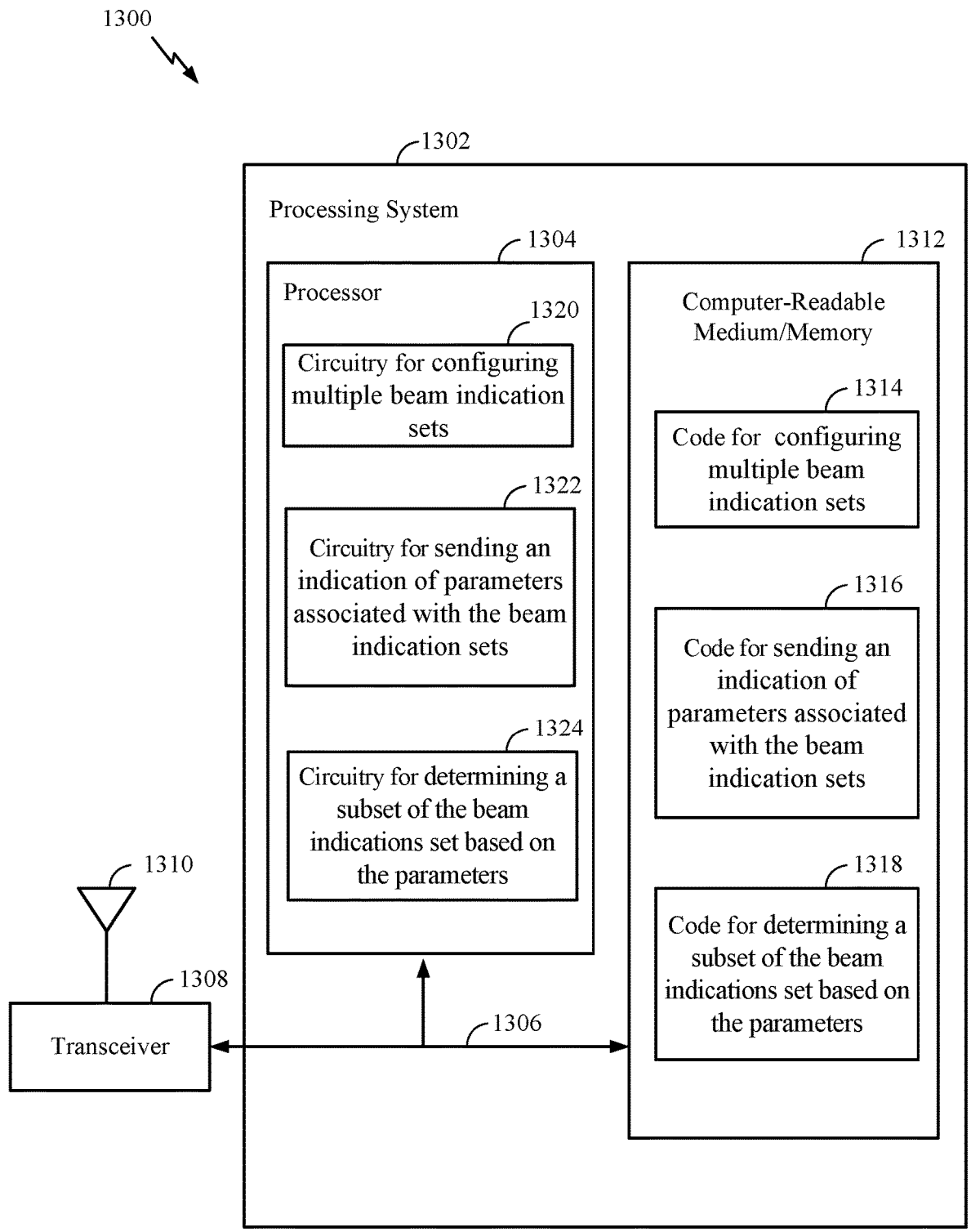
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 6. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 10, or other operations for performing the various techniques discussed herein for beam indication set determination. In certain aspects, computer-readable medium/memory 1312 stores code 1314 for signaling a UE to configure the UE with multiple beam indication sets; code 1316 for sending the UE an indication of one or more parameters and, for each parameter, an associated subset of the multiple beam indication sets; and code 1318 for determining a subset of the multiple configured beam indication sets based on the one or more parameters. In certain aspects, the processor 1304 has circuitry configured to implement the code stored in the computer-readable medium/memory 1312. The processor 1304 includes circuitry 1320 for signaling a UE to configure the UE with multiple beam indication sets; circuitry 1322 for sending the UE an indication of one or more parameters and, for each parameter, an associated subset of the multiple beam indication sets; and circuitry 1324 for determining a subset of the multiple configured beam indication sets based on the one or more parameters.

Figure 14:
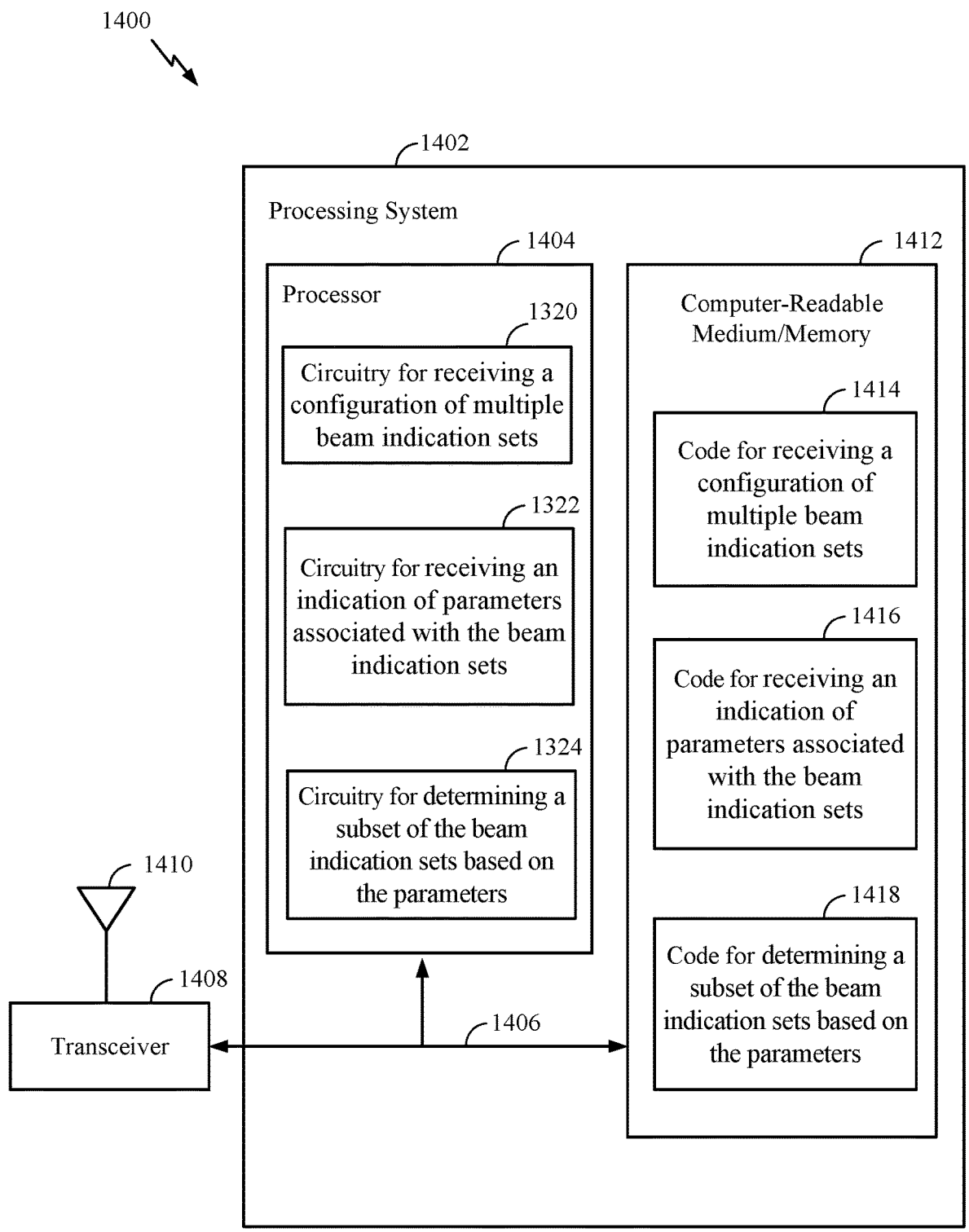
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 10. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 10, or other operations for performing the various techniques discussed herein for beam indication set determination. In certain aspects, computer-readable medium/memory 1412 stores code 1414 for receiving a configuration of multiple beam indication sets; code 1416 for receiving an indication of one or more parameters and, for each parameter, an associated one of the multiple beam indication sets; and code 1418 for determining a subset of the multiple configured beam indication sets based on the one or more parameters. In certain aspects, the processor 1404 has circuitry configured to implement the code stored in the computer-readable medium/memory 1412. The processor 1404 includes circuitry 1420 for receiving a configuration of multiple beam indication sets; circuitry 1422 for receiving an indication of one or more parameters and, for each parameter, an associated one of the multiple beam indication sets; and circuitry 1424 for determining a subset of the multiple configured beam indication sets based on the one or more parameters.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of a list of" items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving a configuration of multiple beam indication sets;
   receiving an indication of one or more parameters and, for each parameter, an associated subset of the multiple beam indication sets wherein receiving the indication of the one or more parameters and associated subset of beam indication sets comprises receiving a set of indices, each index associated with a subset of the multiple beam indication sets, and for each index an associated time interval or location interval in which the subset is configured or active; and
   determining a subset of the multiple configured beam indication sets based on the one or more parameters.

2. The method of claim 1, wherein the beam indication sets comprises at least one of: transmission configuration indication (TCI) state sets or spatial relation sets.

3. The method of claim 1, wherein:
   determining the subset of the multiple configured beam indication sets based on the one or more parameters comprises determining a subset of configured beam indication sets based on the one or more parameters; and
   the method further comprises:
   receiving signaling indicating one or more active beam indication sets from the subset of configured beam indication sets; or
   determining the one or more active beam indication sets based on the one or more parameters.

4. The method of claim 1, wherein determining the subset of the multiple configured beam indication sets comprises determining one or more active beam indication sets of the multiple beam indication sets.

5. The method of claim 1, wherein the one or more parameters comprises one or more time parameters, one or more UE location parameters, one or more UE movement parameters, or a combination thereof.

6. The method of claim 1, wherein:
   the time intervals are indicated as absolute times indicating start times of the time intervals; and
   the location intervals are indicated as starting locations of the location intervals.

7. The method of claim 1, wherein:
   the time intervals are indicated as an absolute time, indicating a start time of an initial time interval, and a set of durations of each of the time intervals; and
   the location intervals are indicated as a starting location of an initial location interval and a set of distances of each location interval.

8. The method of claim 1, wherein the one or more parameters are associated with one or more UE traces, each time or location interval being associated with a UE trace segment, wherein the one or more UE traces comprise one or more predetermined movements of the UE over a period of time corresponding to the one or more time intervals or over a distance corresponding to the one or more location intervals.

9. The method of claim 1, further comprising receiving downlink control information (DCI) scheduling a transmission and indicating a beam indication, of the determined subset of beam indication sets, valid for the transmission.

10. The method of claim 9, wherein:
    the beam indication sets comprise transmission configuration indication (TCI) state sets;
    the DCI schedules a physical downlink shared channel (PDSCH) transmission and indicates a TCI state; and
    the method further comprises determining one or more UE receive beams for receiving the PDSCH based on the indicated TCI state.

11. The method of claim 9, wherein:
    the beam indication sets comprise spatial relation sets;
    the DCI schedules an uplink transmission and indicates a spatial relation; and
    the method further comprises determining one or more UE transmit beams for transmitting the uplink transmission based on the indicated spatial relation.

12. The method of claim 1, wherein the configuration of the multiple beam indication sets, the indication of the one or more parameters, or both is received via at least one of: radio resource control (RRC) signaling or a medium access control control element (MAC-CE).

13. A method for wireless communication by a base station (BS), comprising:
signaling a user equipment (UE) to configure the UE with multiple beam indication sets;
sending the UE an indication of one or more parameters and, for each parameter, an associated subset of the multiple beam indication sets wherein sending the indication of the one or more parameters and associated subset of beam indication sets comprises sending a set of indices, each index associated with a subset of the multiple beam indication sets, and for each index an associated time interval or location interval in which the subset is configured or active; and
determining a subset of the multiple configured beam indication sets based on the one or more parameters.

14. The method of claim 13, wherein the beam indication sets comprises at least one of: transmission configuration indication (TCI) state sets or spatial relation sets.

15. The method of claim 13, wherein:
determining the subset of the multiple configured beam indication sets based on the one or more parameters comprises determining a subset of configured beam indication sets based on the one or more parameters; and
the method further comprises:
signaling the UE indicating one or more active beam indication sets from the subset of configured beam indication sets; or
determining the one or more active beam indication sets based on the one or more parameters.

16. The method of claim 13, wherein determining the subset of the multiple configured beam indication sets comprises determining one or more active beam indication sets of the multiple beam indication sets.

17. The method of claim 13, wherein the one or more parameters comprises one or more time parameters, one or more UE location parameters, one or more UE movement parameters, or a combination thereof.

18. The method of claim 13, wherein:
the time intervals are indicated as absolute times indicating start times of the time intervals; and
the location intervals are indicated as starting locations of the location intervals.

19. The method of claim 13, wherein:
the associated time intervals are indicated as an absolute time, indicating a start time of an initial time interval, and a set of durations of each of the time intervals; and
the location intervals are indicated as a starting location of an initial location interval and a set of distances of each location interval.

20. The method of claim 13, wherein the one or more parameters are associated with one or more UE traces, each time or location interval being associated with a UE trace segment, wherein the one or more UE traces comprise one or more predetermined movements of the UE over a period of time corresponding to the one or more time intervals or over a distance corresponding to the one or more location intervals.

21. The method of claim 13, further comprising transmitting downlink control information (DCI) to the UE scheduling a transmission and indicating a beam indication, of the determined subset of beam indication sets, valid for the transmission.

22. The method of claim 21, wherein:
the beam indication sets comprise transmission configuration indication (TCI) state sets;
the DCI schedules a physical downlink shared channel (PDSCH) transmission and indicates a TCI state; and
the method further comprises determining one or more transmit beams for transmitting the PDSCH based on the indicated TCI state.

23. The method of claim 21, wherein:
the beam indication sets comprise spatial relation sets;
the DCI schedules an uplink transmission and indicates a spatial relation; and
the method further comprises determining one or more receive beams for receiving the uplink transmission based on the indicated spatial relation.

24. The method of claim 13, wherein the configuration of the multiple beam indication sets, the indication of the one or more parameters, or both is signaled via at least one of: radio resource control (RRC) signaling or a medium access control control element (MAC-CE).

25. An apparatus for wireless communication, comprising:
at least one processor; and
a memory coupled to the at least one processor, the memory comprising code executable by the at least one processor to cause the apparatus to:
receive a configuration of multiple beam indication sets;
receive an indication of one or more parameters and, for each parameter, an associated subset of the multiple beam indication sets wherein receiving the indication of the one or more parameters and associated subset of beam indication sets comprises receiving a set of indices, each index associated with a subset of the multiple beam indication sets, and for each index an associated time interval or location interval in which the subset is configured or active; and
determine a subset of the multiple configured beam indication sets based on the one or more parameters.

26. The apparatus of claim 25, wherein the one or more parameters comprises one or more time parameters, one or more location parameters, one or more movement parameters, or a combination thereof.

27. An apparatus for wireless communication, comprising:
at least one processor; and
a memory coupled to the at least one processor, the memory comprising code executable by the at least one processor to cause the apparatus to:
signal a user equipment (UE) to configure the UE with multiple beam indication sets;
send the UE an indication of one or more parameters and, for each parameter, an associated subset of the multiple beam indication sets wherein sending the indication of the one or more parameters and associated subset of beam indication sets comprises sending a set of indices, each index associated with a subset of the multiple beam indication sets, and for each index an associated time interval or location interval in which the subset is configured or active; and
determine a subset of the multiple configured beam indication sets based on the one or more parameters.

28. The apparatus of claim 27, wherein the one or more parameters comprises one or more time parameters, one or more location parameters, one or more movement parameters, or a combination thereof.

* * * * *